July 31, 1945.  C. J. WHITACRE  2,380,815
BRAKE SHOE ADJUSTING MEANS
Filed Dec. 23, 1943

INVENTOR
C. J. WHITACRE
BY
ATTORNEY

Patented July 31, 1945

2,380,815

UNITED STATES PATENT OFFICE 2,380,815

BRAKE SHOE ADJUSTING MEANS

Clarence J. Whitacre, St. Louis, Mo., assignor to Wagner Electric Corporation, St. Louis, Mo., a corporation of Delaware Application December 23, 1943, Serial No. 515,335

8 Claims. (Cl. 188—79.5)

My invention relates to braking mechanism and more particularly to adjusting mechanism for the brake shoes thereof.

One of the objects of my invention is to produce an improved adjusting mechanism for a brake shoe which will permit easy adjustment from the exterior of the brake assembly to compensate for shoe lining wear.

Another object of my invention is to produce an improved adjusting means for the connection between a brake shoe and the movable actuating member therefor which will be totally carried with the connection and arranged to be readily adjusted from the exterior of the brake assembly.

Figure 1:
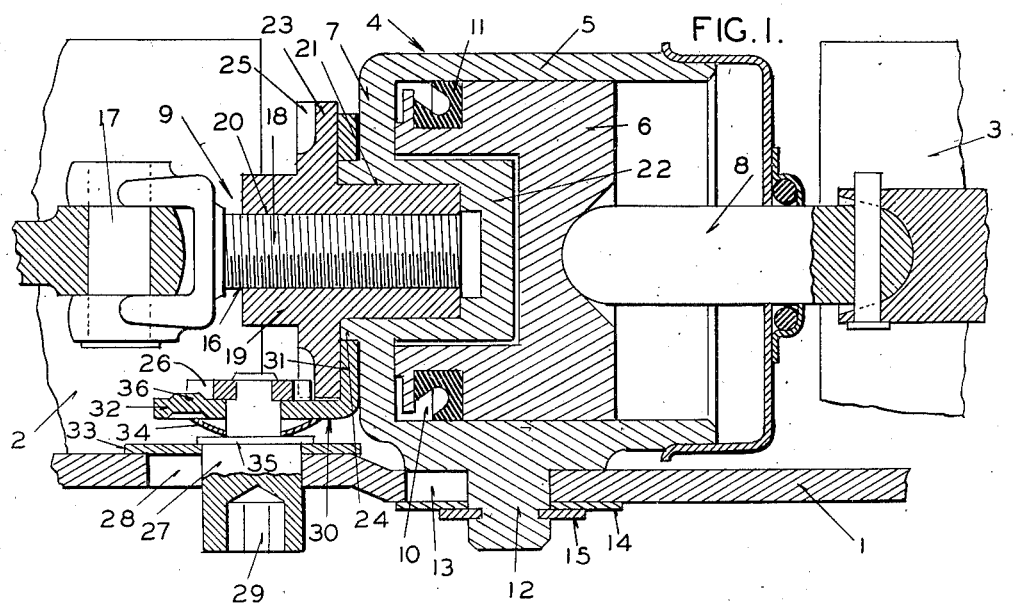
Figure 2:
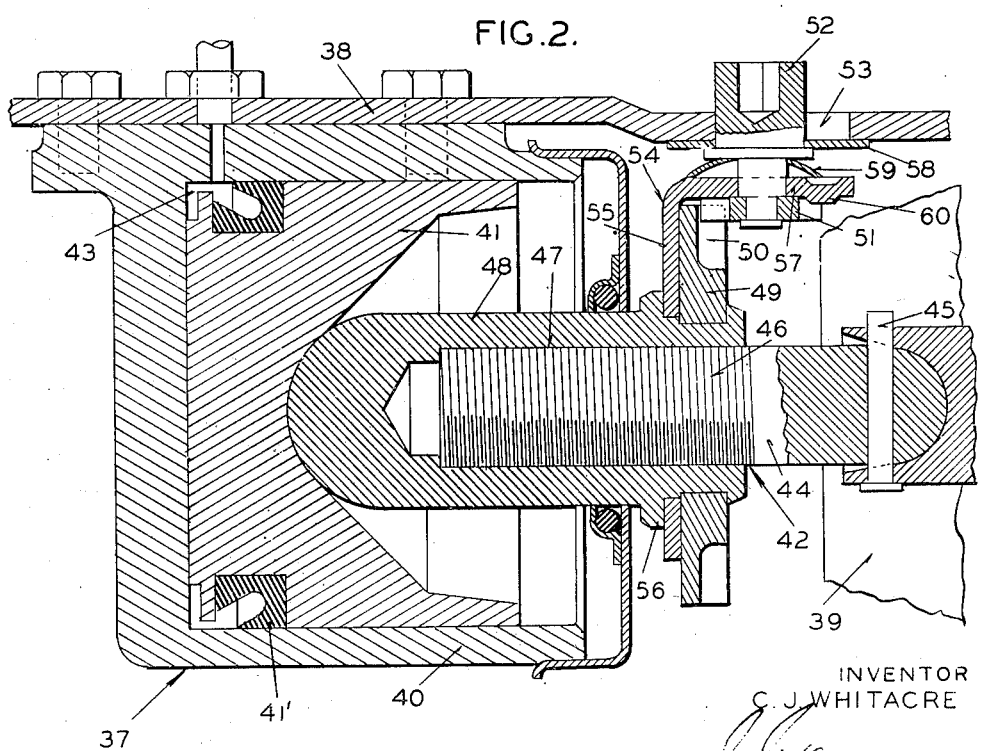

Other objects of my invention will become apparent from the following description taken in connection with the accompanying drawing in which Figure 1 is a sectional view of an actuating mechanism for a brake, showing adjusting mechanism embodying my invention; and Figure 2 is a sectional view of a different actuating mechanism in which my invention is embodied in adjusting mechanism therefor.

Referring to Figure 1 in detail, numeral 1 indicates a support or backing plate for a brake assembly which encloses the usual brake drum (not shown) and supports brake shoes 2 and 3 actuated by a "floating" fluid motor 4. The fluid motor comprises a cylinder 5 and a piston 6, the cylinder being closed at one end by a wall 7 and open at its other end. The piston 6 is connected to actuate the brake shoe 3 by a connecting means 8 and cylinder 5 is connected to actuate brake shoe 2 by a connecting means 9. Both the cylinder and the piston are adapted to have relative movement with respect to the backing plate 1 so that when fluid under pressure is forced into the cylinder chamber 10 between the end wall 7 of the cylinder and the piston, the brake shoes will be forced outwardly and applied to the drum. Chamber 10 is connected to the source of pressure (not shown) and a packing cup 11 is associated with the piston to prevent leakage past its periphery. The fluid motor is supported by the backing plate by means of an integral pin 12 extending from the cylinder and projecting into a slot 13 in the backing plate. A washer 14 and locking ring 15 hold the cylinder to the backing plate yet permit it to move relatively to said backing plate.

The connecting means 9 between the cylinder and brake shoe 2 has my improved adjusting means associated therewith. It comprises a link 16 having a forked end which is pivoted to the brake shoe by means of a pin 17. The link is provided with threads 18 and cooperating therewith is a member 19 having a threaded bore 20. Member 19 is journaled in a bore 21 formed in an inward projection 22 carried by the end wall 7 of the cylinder, said end wall providing an abutment for limiting the inward movement of piston 6 of the cylinder. Member 19 also has an integral annular flange 23 intermediate its ends which is adapted to abut against an axial flange 24 at the end of the cylinder bore 21. It is seen that by means of this link construction when member 19 is turned on link 16, the connecting means 9 can be adjusted to vary the length thereof between the cylinder and brake shoe 2. Thus when there is lining wear of brake shoe 2, such can be compensated for by making an adjustment of the connecting means 9.

In order that the connecting means 9 can be readily adjusted from the exterior of the backing plate 1, flange 23 is provided with teeth 25 on one of its surfaces. Cooperating with these teeth is a gear 26 secured to the inner end of a shaft 27, said gear and shaft having their axes at right angles to the axis of member 19 and the link upon which it is threaded. The shaft 27 extends through a slot 28 in the backing plate in order to be accessible from the exterior of said backing plate and the outer end of the shaft is provided with an irregular socket 29 for receiving a suitable wrench to turn the shaft and gear. In order to support the gear and shaft and maintain the gear in constant mesh with teeth 25 of member 19, an L-shaped bracket 30 is provided. One leg 31 of this bracket is provided with a hole for mounting the bracket upon flange 24 between the toothed flange 23 of the threaded member 19 and the end wall 7 of the cylinder. The other leg 32 of the bracket has shaft 27 journaled therein. Since member 19 moves only when the cylinder is moved, the bracket and shaft will be moved therewith and thus the meshing of the cooperating teeth will be maintained.

Slot 28 in the backing plate is adapted to be covered by a flat washer 33 carried by shaft 27. A spring washer 34 is positioned between a shoulder 35 on shaft 27 and leg 32 of the bracket to hold the gear against the leg. A portion of the leg adjacent the gear is formed with a protuberance 36 which extends between the teeth of the gear and acts, under the action of the spring washer, as a yieldable detent means for holding the shaft from accidental turning.

From the foregoing description it is seen that member 19 may be readily adjusted whenever it is desired to change the length of the connecting means. The adjustment is conveniently made from the exterior of the backing plate by merely turning shaft 27. The shaft and gear will always be movable with the connection and, therefore, the meshing of the teeth between the gear and member 19 will always be maintained. The advantage of this is that there will be no possibility of the teeth becoming unmeshed due to movement of the connecting means as would be possible if the shaft 27 were journaled in the backing plate and not movable with the toothed member on the connecting means. The arrangement also eliminates the necessity of long axially extending teeth on member 19 which are required when gear 26 is journaled in the backing plate. The bracket 30, the gear and the shaft are all prevented from any turning about the axis of member 19 and link 16 by the extension of the shaft through the slot in the backing plate.

In the structure shown in Figure 2 the fluid motor 37 is fixed to the backing plate 38 instead of being of the "floating" type. This motor is adapted to actuate only one brake shoe 39 and comprises a cylinder 40 bolted to the backing plate with a piston 41 therein connected to operate the brake shoe by the connecting means 42. Piston 41 is adapted to abut the closed end of the cylinder so that shoe 39 can anchor on the backing plate through the cylinder. The piston is provided with a sealing cup 41' and when fluid under pressure is forced into chamber 43, the piston will be moved in the cylinder and the brake shoe 39 actuated.

The connecting means 42 comprises a link 44 pivoted at one end to shoe 39 by a pin 45. The link is provided with threads 46 for cooperation with the threaded bore 47 of a cylindrical link 48 having a closed spherical end for engagement with a socket in the piston. The cylindrical link 48 carries an annular disc 49 at its inner end having teeth 50 on one of its surfaces. The teeth of this disc cooperate with the teeth of a gear 51 carried by a shaft 52 which extends through a slot 53 in the backing plate. The shaft and gear are carried on the link 48 by an L-shaped bracket 54, one leg 55 of which is mounted upon the link between a shoulder 56 thereon and the toothed disc, and the other leg 57 having the shaft journaled therein. The shaft has associated therewith a slot closure washer 58 and a spring washer 59 which acts to bias the gear against the leg of the bracket and also establishes a yieldable detent as a result of the protuberance 60 of the leg which can project between the teeth of the gear.

It is to be noted that in the structure shown in Figure 2 the adjustment of the connecing means between the shoe and the piston can be made in the same manner as that of Figure 1, that is, by simply turning shaft 52 which extends out of the slot in the backing plate. The bracket maintains the teeth of disc 49 and the teeth of gear 51 in constant mesh and the gear and disc always move together whenever the connecting means comprising links 46 and 48 is moved by piston 41.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a brake shoe for cooperation with a drum, a movable actuating member, connecting means between the actuator and shoe comprising a rotatable member for varying the length of the connecting means, toothed means supported on the rotatable member, a right angled bracket means mounted to move with the connecting means when moved by the actuating member but permitting relative rotation of the rotatable member, and a rotatable toothed member journaled in one leg of the bracket means, said toothed member having its axis at an angle to the axis of the rotatable member of the connecting means and its teeth held in constant cooperative engagement with the teeth of the toothed means carried by said rotatable member of the connecting means.

2. In braking mechanism, a backing plate, a brake shoe mounted on said plate for cooperation with a drum, a movable actuating member, connecting means between the actuator and the shoe comprising two relatively rotatable threaded memebrs cooperating with each other and the actuating member and shoe, toothed means carried by one of the rotatable members, an L-shaped bracket having one leg mounted on and arranged to move with the connecting means when moved by the actuating member, a gear journaled in the other leg of the bracket and having its teeth cooperating with the toothed means carried by said rotatable member whose actuating member extends through said backing plate.

3. In braking mechanism, a backing plate provided with a slot, a brake shoe for cooperation with a drum, a movable actuating member, connecting means between the actuator and shoe comprising a rotatable member for varying the length of the connecting means, toothed means supported on the rotatable member, a right angled bracket means mounted to move with the connecting means when moved by the actuating member but permitting relative rotation of the rotatable member, and a rotatable toothed member and shaft journaled in one leg of the bracket means, said toothed member having teeth engaging the teeth of the toothed means and the shaft extending through the slot to the exterior of the backing plate, said slot and shaft cooperating to prevent turning of the bracket means about the axis of the rotatable member.

4. In braking mechanism, a brake shoe for cooperation with a drum, a movable actuating member, connecting means between the actuator and shoe comprising a rotatable member for varying the length of the connecting means, toothed means carried by the rotatable member and movable with the connecting means, bracket means mounted to move with the connecting means when moved by the actuating member but permitting relative rotation of the rotatable member, a rotatable toothed member journaled in the bracket means, said toothed member having its axis at an angle to the axis of the rotatable member of the connecting means and teeth thereof held in cooperative engagement with teeth of the toothed means carried by said rotatable member of the connecting means, spring means biasing the toothed member toward the bracket means, and means carried by the bracket and cooperating with the teeth of the toothed member for establishing with the spring means a yieldable detent means for the toothed member.

5. In braking mechanism, a backing plate, a brake shoe mounted on said plate for cooperation with a drum, an actuating member, a connection between the member and shoe comprising a non-rotative member and a rotative member having cooperating threads for changing the length of the connection by a rotation of the rotatable member, toothed means carried by the rotatable member, an L-shaped bracket having one of its legs mounted about and arranged to move with the rotatable member, for movement with the connection said one leg and rotatable member so mounted as to permit rotation of the rotatable member in said leg, a shaft journaled in the other leg of said bracket, and a gear on the shaft having teeth thereof engaging teeth of the toothed means on the rotatable member, said shaft extending through said backing plate.

6. In braking mechanism, a backing plate, a brake shoe mounted on said plate for cooperation with a drum, an actuating member, a connecting means between the member and shoe comprising a non-rotative member and a rotative member having cooperating threads for changing the length of the connection by a rotation of the rotatable member, toothed means carried by the rotatable member, an L-shaped bracket having one of its legs mounted on and arranged to move with the rotatable member for movement with the connecting means, a shaft journaled in the other leg of said bracket, said shaft extending through said backing plate, a gear on the shaft having teeth thereof engaging teeth of the toothed means on the rotatable member, and spring means for biasing the gear against the leg of the bracket in which the shaft is journaled.

7. In braking mechanism, a backing plate provided with a slot, a brake shoe for cooperation with a drum, a movable actuating member, connecting means between the actuator and shoe comprising a rotatable member for varying the length of the connecting means, toothed means carried by the rotatable member and movable with the connecting means, an L-shaped bracket having one leg mounted on and arranged to move with the connecting means when moved by the actuating member but permitting relative rotation of the rotatable member, a rotatable shaft journaled in the other leg of the bracket with its axis at an angle to the axis of the rotatable member of the connecting means, said shaft extending through the slot in the backing plate to the exterior thereof and having a wrench receiving portion on its end, and a gear carried by the shaft and having teeth thereof constantly meshing with teeth of the toothed means on the rotatable member, said shaft and slot cooperating to prevent rotation of the bracket about the axis of the rotatable member.

8. In braking meechanism, a brake shoe for cooperation with a drum, a movable actuating member provided with a cylindrical bore, a connection between the actuating member and the shoe comprising a non-rotatable threaded member operatively connected to the shoe and a second threaded member cooperating with the first member, said second member being operatively connected to the actuating member and having a cylindrical extension journaled in the bore thereof, a toothed member carried by the second member, an L-shaped bracket having one leg mounted to move with the connection and the actuating member, and a gear cooperating with the toothed member and journaled in the other leg of the bracket with its axis at an angle to the axis of the toothed member.

CLARENCE J. WHITACRE.